UNITED STATES PATENT OFFICE.

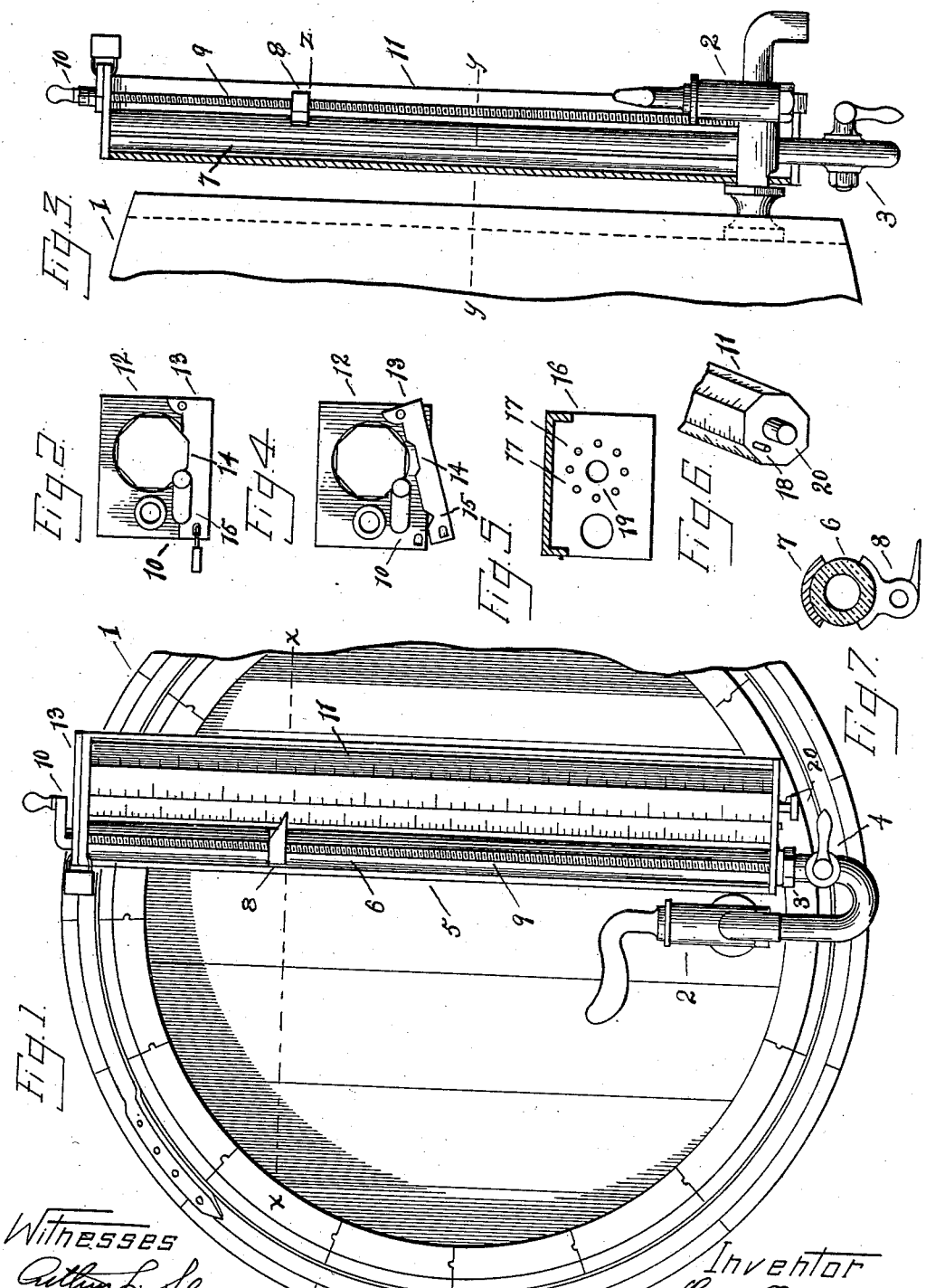

LOUIS MEYER, OF SAN FRANCISCO, CALIFORNIA.

LIQUID-GAGE.

1,080,153.  Specification of Letters Patent.  Patented Dec. 2, 1913.

Application filed July 11, 1912. Serial No. 708,889.

*To all whom it may concern:*

Be it known that I, LOUIS MEYER, a citizen of the United States, residing in the city and county of San Francisco, State of California, have invented certain new and useful Improvements in Liquid-Gages, of which the following is a specification.

My invention relates to liquid gages and its object is to provide a cheap and efficient means whereby the proprietor may see at a glance the amount of liquid that has been drawn from a barrel or cask to which this gage is attached.

My invention is illustrated in the accompanying drawings, in which:—

Figure 1, is an end view in elevation of a barrel or cask with the gage mounted in place. The controlling screw and the rotating scale is locked. (The level of the liquid in the barrel or cask is shown by the dotted line $x$—$x$.) The stop-cock is closed. Fig. 2, is a plan view of the top of the gage showing the end of the tube and scale with the hasp closed and locked, securing both the controlling screw and scale. Fig. 3, is a broken view in elevation of a barrel or cask showing the head with gage mounted in place. The controlling screw and the rotating scale is locked. (The level of the liquid in the barrel or cask is shown by the dotted line $y$—$y$, and the former level is shown by the indicator at $z$.) The stop-cock is open. Fig. 4, is a plan view of the top of the gage showing the end of the tube and scale with the hasp unlocked and open, freeing the controlling screw and scale. Fig. 5, is a plan view of the bottom of the gage showing the trunnion hole surrounded by the index holes for setting the rotating scale. Fig. 6, is a broken view of the lower end of the rotating scale with multiple sides, showing the trunnion and the index pin. Fig. 7, is a plan view of the indicator with the glass and guard in cross-section.

Referring by reference characters to this drawing the numeral 1 designates a barrel to which my improved gage is applied and 2 a faucet with an inverted union 3 having a stop cock 4. Mounted on the upturned end of the union 3 is a gage housing within which is a glass tube 6 having its lower end in communication with the end of the union. Partially encircling the glass tube is a guard comprising a slotted tube having its ends embracing the glass tube. Journaled in the housing and parallel with the tube is a screw shaft 9 which passes through a threaded opening in a non-rotatable indicator 8, the screw being provided with a handle by which the screw may be turned to raise or lower the indicator. Also mounted in the housing is a rotatable scale 11 with a plurality of graduated sides or faces. The top 12 of the gage housing carries a pivoted locking hasp 13 having locking depressions 14 and 15 adapted to register with noncircular portions of the scale and screw rod respectively to lock these against turning, the hasp being designed to be locked in position by any suitable means, as for instance the pad lock 15$^a$. In the bottom plate 16 of the housing is a trunnion hole 19 to receive the trunnion 20 of the scale and also a plurality of concentric holes 16 adapted to receive the index pin 18. The lower end of the trunnion 20 is provided with a head or nut which keeps the scale from being removed.

The operation of my invention is as follows: The faucet with its inverted union and stop-cock is inserted in the head of the barrel or cask in the usual manner, the stop-cock being closed to prevent the loss of the liquid until the gage is attached. The device is then mounted in place by means of the union, and the stop-cock is opened, allowing the liquid in the glass to rise to the level of that in the barrel or cask. The jointed hasp on the top of the gage housing is then unlocked and opened, and, by means of the handle on the controlling screw, the indicator is moved into such a position that it will bring the lower face thereof in line with the liquid in the glass. (The position of the indicator above described and the level of the liquid in the barrel or cask is shown by the dotted line $x$—$x$, in Fig. 1.) The multiple sided scale with the differential graduations thereon, is now turned until the level of the liquid in the barrel or cask, (indicated by the dotted line $x$—$x$, Fig. 1,) corresponds with the highest number of gallons graduated on that side; for example, if the barrel or cask is one of fifty gallons capacity, the side of the scale on which "fifty" is the highest graduated number is turned toward the indicator, thus showing that fifty gallons was the amount in the original package. The jointed hasp on the top of the housing is now closed and locked. By means of the depressions in said jointed hasp, articulating accurately with the profile of the projection on the base of the handle operating the controlling screw and the contour of the scale mentioned, the gage is locked in registering position. It will be noted that the stop-cock in the inverted union has nothing to do with the registering device, and is only used to prevent the loss of liquid during the mounting and unmounting of the gage. The gage now being set and locked, the liquid is ready for sale or use, being drawn off in the quantities required, by means of the faucet. When the proprietor wishes to check the amount of liquid disposed of, he first assures himself that the stop-cock is open, so that the liquid in the glass will show the level of that in the barrel or cask. (Indicated by the dotted line y—y, Fig. 3.) The lock is then removed and the jointed hasp on the top of the gage housing is opened; then, by means of the handle on the controlling screw, the indicator is moved downwardly until the lower face thereof is in line with the liquid in the glass. It will be readily seen that the difference between the position of the indicator, and its corresponding graduation on the scale, (as reset) and the former position of said indicator, showing the full barrel or cask, will indicate the amount of liquid in gallons, and the fractions thereof, that have been drawn. The device is now locked as before and is again ready to check the amount of liquid drawn. For convenience in setting the scale so that its proper side may be next to the indictor, the index holes in the bottom of the gage housing are provided. The index pin is so placed in the lower end of the scale that when it has entered an index hole, the said scale is not only in the right position relative to the indicator, but is also in place for locking.

Having thus described my invention, what I claim as new and desire to secure by Letters Patent, is:—

1. In a liquid gage and in combination, a faucet having an inverted union with a stop-cock thereon and a means for attaching said faucet to a barrel or cask; a housing of suitable material mounted on said faucet by means of the inverted union; a glass tube within said housing so disposed that the opening thereof may articulate with the opening in said union and be secured thereto; a graduated scale within said housing, parallel with, and adjacent to said tube; a rotatably mounted screw within said housing, parallel and adjacent to said tube, said screw having mounted thereon an indicator with threads therein, articulating and in mesh with the threads of said screw; a handle having a base with a projection, said handle with base and projection rigidly mounted on said screw; a jointed locking hasp movably mounted on the top of said housing, said hasp having depressions in the side thereof so disposed as to engage and articulate with the contour of the scale and the profile of the projection on the base of the controlling screw handle, and a means for locking said hasp; substantially as described and claimed.

2. In a liquid gage and in combination, a faucet having an inverted union with stop-cock thereon and a means for attaching said faucet to a barrel or cask; a housing of suitable material mounted on said faucet by means of the inverted union, a glass tube within said housing so disposed that the opening thereof may articulate with the opening in said union, and be secured thereto; a rotating scale with multiple sides within said housing parallel with, and adjacent to said tube; a screw rotatably mounted within said housing in line with said tube, said screw having mounted thereon an indicator with threads therein, articulating with and in mesh with the threads of said screw; a handle having a base with a projection, said handle with base and projection rigidly mounted on said screw; a jointed locking hasp movably mounted on the top of said housing, said hasp having depressions in the side thereof so disposed as to engage and articulate with the contour of the scale and the profile of the projection on the base of the controlling screw handle, and a means for locking said hasp, substantially as described.

3. In a liquid gage and in combination, a faucet having an inverted union with stop-cock thereon and a means for attaching said faucet to a barrel or cask; a housing of suitable material mounted on said faucet by means of the inverted union, a glass tube within said housing so disposed that the opening thereof may articulate with the opening in said union, and be secured thereto; a guard for said tube, a revolving scale with multiple sides within said housing parallel with and adjacent to said tube; a screw rotatably mounted within said housing, in line with said tube, said screw having mounted thereon an indicator with threads therein, articulating and in mesh with the threads of said screw; a handle having a base with a projection, said handle with base and projection rigidly mounted on said screw; a jointed locking hasp movably mounted on the top of said housing, said hasp having depressions in the side thereof so disposed as to engage and articulate with the contour of the scale and the profile of the projection on the base of the controlling screw handle, and a means for locking the same, substantially as described and claimed.

4. In a liquid gage and in combination, a faucet having an inverted union with stop-cock thereon and a means for attaching said faucet to a barrel or cask; a housing of suitable material mounted on said faucet by means of the inverted union, a glass tube within said housing so disposed that the opening thereof may articulate with the opening in said union, and be secured thereto; a guard for said tube; a revolving scale with multiple sides having differential graduations thereon, within said housing, parallel and adjacent to said tube; an index pin in the lower end of said scale, index holes in the bottom plate of the housing so disposed as to engage said pin; a screw rotatably mounted within said housing, and in line with said tube, said screw having mounted thereon an indicator with threads therein, articulating and in mesh with the threads of said screw; a handle with a base having a projection, said handle with base and projection rigidly mounted on said screw; a jointed hasp movably mounted on the top of said housing, said hasp having depressions in the side thereof so disposed as to engage and articulate with the contour of the scale and the profile of the projection on the base of the controlling screw handle, and a means for locking said hasp, substantially as described.

5. In a liquid gage and in combination, a faucet having an inverted union and stopcock thereon, and a means for attaching said faucet to a barrel or cask; a housing of suitable material mounted on said faucet by means of the inverted union, a glass tube within said housing so disposed that the opening thereof may articulate with the opening in said union, and be secured thereto; a guard for said tube, said guard being a partially slotted tube with the ends encircling the glass sufficiently for cementing purposes, a revolving scale with multiple sides having differential graduations thereon, within said housing, parallel and adjacent to said tube; an index pin in the lower end of said scale, index holes in the bottom plate of the housing so disposed as to engage said pin; a screw rotatably mounted within the housing and in line with said tube, said screw having mounted thereon an indicator with threads therein, articulating and in mesh with the threads of said screw; a handle with a base having a projection, said handle with base and projection rigidly mounted on said screw; a jointed hasp movably mounted on the top of said housing, said hasp having depressions in the side thereof so disposed as to engage and articulate with the contour of the scale and the profile of the projection on the base of the controlling screw handle, and a means for locking said hasp, substantially as described and claimed.

In testimony whereof, I affix my signature in presence of two witnesses.

LOUIS MEYER.

Witnesses:
HORTENSE GARDNER,
WITH GRANT MURRAY.

---

Copies of this patent may be obtained for five cents each, by addressing the "Commissioner of Patents, Washington, D. C."